United States Patent [19]
McFayden et al.

[11] 3,915,247
[45] Oct. 28, 1975

[54] ELECTRICAL BALANCE APPARATUS

[75] Inventors: Ronald F. McFayden, La Habra; Kenneth J. Moriyama, Placentia, both of Calif.

[73] Assignee: Ventron Corporation, Beverly, Mass.

[22] Filed: Sept. 9, 1974

[21] Appl. No.: 504,453

[52] U.S. Cl. ............ 177/210; 177/212; 177/DIG. 9
[51] Int. Cl.² ..................... G01G 3/14; G01G 7/00
[58] Field of Search ....... 177/210, 212, 246, DIG. 9

[56] References Cited
UNITED STATES PATENTS

| | | | |
|---|---|---|---|
| 2,939,694 | 6/1960 | Bradley | 177/DIG. 9 |
| 3,148,742 | 9/1964 | Giulie | 177/246 X |
| 3,347,328 | 10/1967 | Schieser et al. | 177/229 |
| 3,685,604 | 8/1972 | Smith et al. | 177/DIG. 9 |
| 3,734,218 | 5/1973 | Kupper | 177/DIG. 9 |

*Primary Examiner*—George H. Miller, Jr.
*Attorney, Agent, or Firm*—Fraser and Bogucki

[57] ABSTRACT

A high sensitivity wide range microbalance suspension in which a top loading pan joined to a force coil coupled vertical support is coupled with low hysteresis torsion ribbon pivot elements to parallel spaced-apart planar beam arms, the arms joined also with torsion ribbon pivot elements and reaction force absorbing spring loaded screws remote from the vertical support to a fixed frame thereby defining a deformable parallelogram suspension arrangement which provides asymmetric pan loading compensation. Movable support coupled stop elements travel within fixed surfaces on the frame to limit travel of the pan while allowing measurement of a mass beyond yield strength limitations of the ribbon elements by providing negligible moment about the vertical support coupled ribbon elements.

25 Claims, 7 Drawing Figures

ELECTRICAL BALANCE APPARATUS

BACKGROUND OF THE INVENTION

1. Field of the Invention

This invention relates to null restoring top loading electical balances. In particular, this invention relates to a suspension arrangement for such mass measuring apparatus.

2. Description of the Prior Art

High sensitivity balances, such as those which measure fractions of a milligram, have been in use for a number of years. Top loading balances, or those in which a mass may be measured by placing it on a pan which exerts a weight on a suspension mechanism, are convenient for an operator required to measure a large number of items. High sensitivity wide range balances are particularly desirable for uses such as weighing precious minerals, as well as other analytic functions. High sensitivity balances, both top loading and other types, have been limited in ranges which could be weighed, primarily by the strength of the suspension and the sensitivity to force in balances. A weight exceeding the yield strength of the suspension would cause hysteresis errors, or even catastrophic failure. To some extent, stop elements or brakes have been used to prevent suspension failure in the event of placement of a weight on the sample pan in excess of that permitted by the structure but have been of limited use in substantially extending weighing ranges. Available wider range balances with sturdier suspensions have often lacked sufficient sensitivity.

Ribbon suspensions are known in connection with "torque motor" arrangements whereby a weight causes the twisting of a central taut ribbon armature suspension of the torque motor, while a restoring torque generated by the motor is used to return the balance to a null position. The amount of current required to generate a force which counterbalances or restores the balance to its null position is measured and a mass determination is thereby obtained. This type of measurement is more accurate than a deflection measurement, because the angle of twist of the ribbon resulting from the sample mass is not perfectly linear and is dependent on gravitational orientation.

Restoring force balances are frequently of two types. One type uses a torque motor as described above. Another utilizes a force coil, solenoid, or linear motor arrangement.

One of the prior weaknesses of top loading balances as compared with "weigh below" or suspended load balances, has been that, if properly designed with low friction, low hysteresis hangdown attachments, the suspended load balance exerts the same force upon the suspension mechanism, irrespective of the particular position of the load on the sample pan. Top loading balances require symmetric loading to prevent errors caused by moments about the central portion of the weighing pan. Such errors have been reduced to a certain extent with a beam configured in a deformable parallelogram arrangement with knife edge pivots. In these systems, movements caused by asymmetric loading are compensated by reaction forces of the beam on the pivots of the parallelogram; however, the sensitivity of such balances is limited.

SUMMARY OF THE INVENTION

A high sensitivity balance of the type having means for returning a portion of the balance to a null position is provided in accordance with this invention in which generally horizontal beam arm means pivotally link sample support means to a fixed frame. Ribbon means couple the arm means to the frame, providing low friction, low hysteresis torsional pivots. Stop means limit travel of the sample support means and are disposed with respect to the sample support means such that negligible moment is generated about the stop means as a result of an excess load, thereby limiting forces applied to the pivots as a result of the excess load.

In a preferred embodiment of the invention, arm means comprise upper and lower beam arms which are coupled to extending portions of the frame. A force coil arrangement has a fixed portion coupled to the frame and a movable portion. The same support means comprises a vertical support coupled beneath a sample pan and rigidly coupled to the movable portion of the force coil means such that the movable portion travels with respect to the frame together with a deflection of the sample pan. Ribbons couple upper and lower arms to the vertical support, and remote therefrom, couple with spring loaded fasteners the upper and lower arms to the frame. Stop means are provided for limiting travel of the vertical support and are disposed in substantial alignment with the pan such that an excess load on the pan generates negligible moment about the stop means providing wide range weighing capability while maintaining high sensitivity. The upper and lower arms, the vertical support and a fixed axis remote from the vertical support passing through the ribbon coupling to the frame define a deformable parallelogram flexure arrangement and, together with the spring loaded fasteners oppose asymmetrically distributed forces on the sample pan.

In further embodiments, the ribbon elements are conductive and are coupled directly to the coil to carry an electrical current therethrough. The ribbons are pretensioned to provide proper torsional stiffness to the ribbon torsion pivots. Plates and fasteners clamp the ribbons to the arms and to the frame.

In particular embodiments of the invention, the fixed portion of the force coil means comprises a pair of facing magnetic cup elements coupled to the base providing a shield from stray magnetic fields, each having a magnetized central element and pole piece disposed within the cup to provide radially directed magnetic field lines which are efficiently cut by a coil or coils of the movable portion of the force coil moving within the annular region between the central elements and the cups. A non-magnetic spacer is used to space the cup elements from one another which are disposed in facing relationship.

The upper and lower arms have a plurality of apertures to limit beam arm weight while maintaining axial flexural stiffness. Counterweight elements are disposed remote from the ribbon pivots to provide an initial manual balance adjustment.

BRIEF DESCRIPTION OF THE DRAWINGS

A better understanding of the invention may be had by reference to the following description in conjunction with the accompanying drawings, in which.

DETAILED DESCRIPTION

Figures 1, 2:
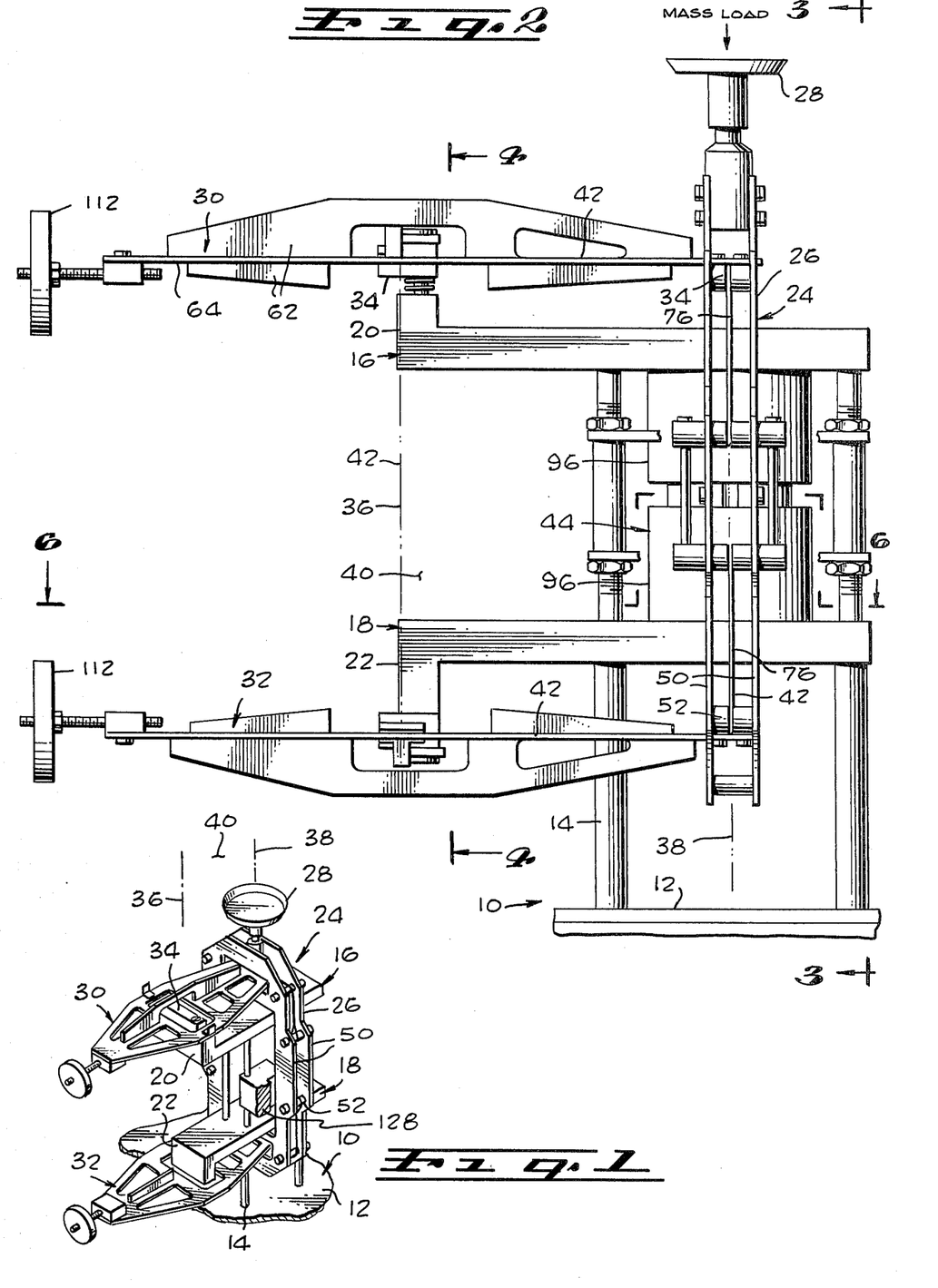
FIG. 1 is a perspective view of a preferred embodiment of the suspension in accordance with this invention with portions exposed and portions removed.
FIG. 2 is a front view of the suspension depicted in FIG. 1 in accordance with this invention with portions exposed and portions removed.
Figures 3, 4, 7:
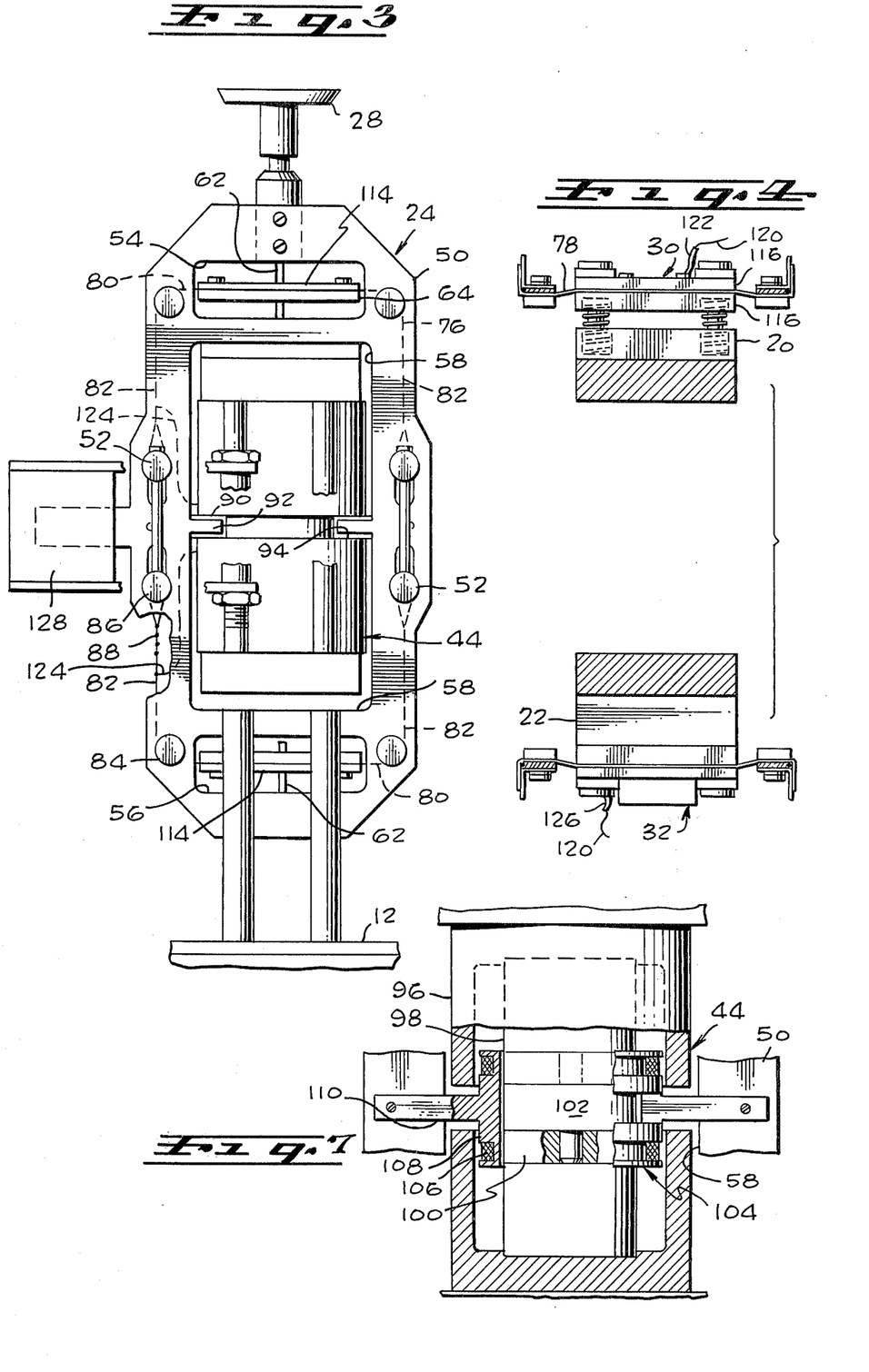
FIG. 3 is a right side view of the suspension depicted in FIG. 1.
FIG. 4 is a left side view of portions of the suspension in FIG. 1.
FIG. 7 is a detailed side view of a portion of the suspension depicted in FIG. 1 partly in section taken along line A—A of FIG. 2.

With reference particularly to FIGS. 1, 2 and 3, a preferred embodiment of a top loading suspension in accordance with this invention comprises a frame 10 having a platform base 12 and a plurality of risers 14 joined to the platform base disposed perpendicular thereto and upper and lower elongated supports 16, 18 extending laterally from the risers 14 in a spaced-apart parallel relationship. The upper elongated support 16 has a short upwardly extending leg 20 remote from the risers 14 and the lower elongated support 18 has a short downwardly depending leg 22 remote from the risers 14.

Sample support means 24 comprises a vertical structure 26 and a sample pan 28 disposed thereon. A beam arrangement comprises an upper ribbed planar beam arm 30 and a lower ribbed planar beam arm 32. The upper and lower beam arms 30, 32, the upwardly extending leg 20, the downwardly depending leg 22 and the vertical structure 26 are coupled together with a ribbon arrangement 34.

Fixed axis 36 passes through the upwardly extending leg 20 and the downwardly depending leg 22. A vertical weighing axis 38 passes through the vertical structure 26 and the sample pan 28. The vertical weighing axis 38 and the fixed axis 36 specify a selected plane 40 and the upper and lower ribbed planar beam arms 30, 32, the weighing axis 38 and the fixed axis 36 define a deformable parallelogram structure 42.

The suspension described thus far utilizes parallelogram geometry to compensate for asymmetric loading, a characteristic difficulty encountered with top loading balances. A load having a force component outside of the vertical weighing axis 38 would experience a moment about axis 38 which would cause inaccuracies in weighing, if only a single beam were present. The parallelogram with dual beams provided by the upper and lower arms 30, 32 forming two parallel sides of the structure 42, provides reaction forces on the torsion pivots of the ribbon arrangement 34 to compensate for errors primarily resulting from force components within the selected plane 40. The structure 42 deforms somewhat, the opposing branches maintaining a parallel though slightly spacially varying relationship and the angles between adjacent branches changing slightly, so as to allow vertical travel of the vertical support 26 in response to a force. Compensation for sample pan loading components asymmetric with respect to the selected plane 40, is aided in this invention in the manner of coupling an element of the ribbon arrangement 34 to the upwardly extending leg 20 with spring loaded fasteners. Asymmetric loading compensation involves complex and subtle interaction between balance elements and thus, the structure must be considered with respect to all its elements. The use of the ribbon arrangement 34 provides torsional pivot bearings of low friction and low hysteresis and therefore provides a suspension of very high sensitivity.

High sensitivity is further enhanced in this suspension by the use of a force coil arrangment 44 directly in line with the load on the sample pan 28 eliminating the necessity for linkages which would otherwise reduce sensitivity of the suspension.

The vertical support 26 comprises a pair of thin elongated plate elements 50 disposed in a closely spaced-apart relationship and includes a plurality of insulating spacer rods 52 disposed transversely between and coupling the thin elongated plate elements 50. The planes of the plate elements 50 are disposed about the weighing axis 38 and substantially normal to the selected plane 40. The plate elements 50 have upper and lower arm receiving apertures 54, 56 and force coil cup receiving apertures 58 therein.

Figure 5:
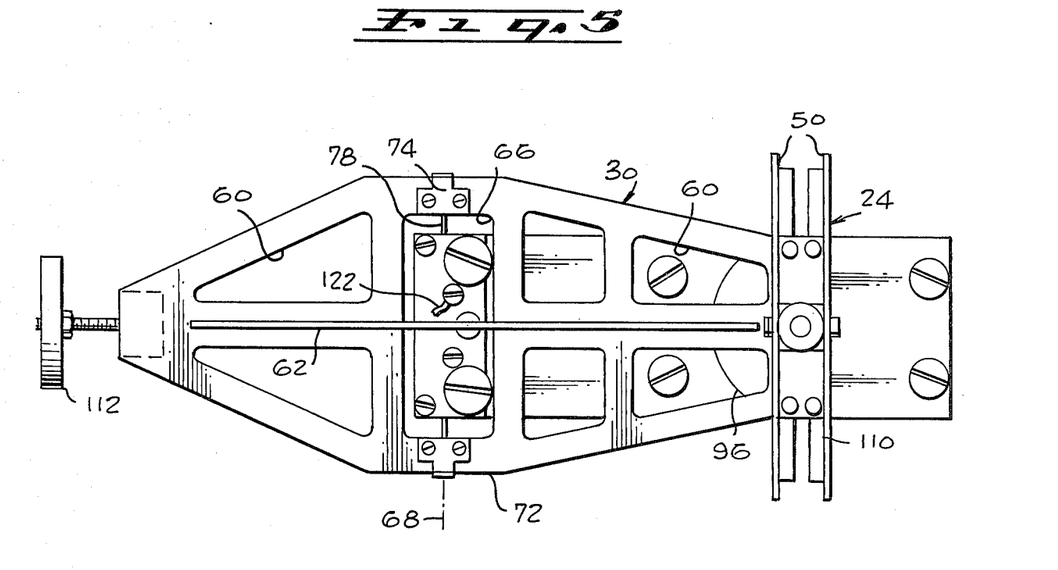
FIG. 5 is a top view of the suspension depicted in FIG. 1 with portions removed.
Figure 6:
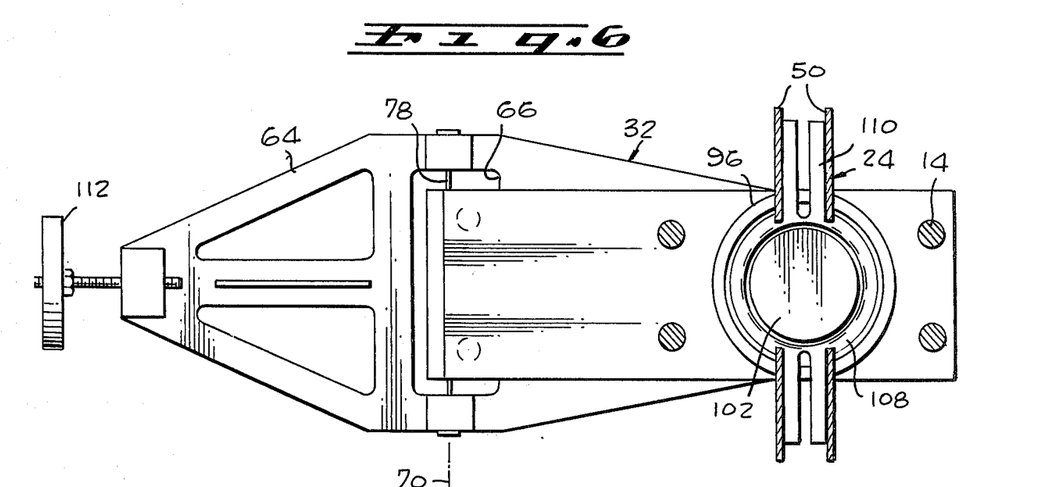
FIG. 6 is a top view of the suspension depicted in FIG. 1.

As best viewed in FIGS. 1, 2 and 5, both the upper and lower ribbed planar beam arms 30, 32, comprising a lightweight material such as aluminum, have a plurality of apertures 60 to limit beam arm weight and ribs 62 extending normal from upper and lower webbed plate elements 64 to increase axial and vertical beam arm rigidity. The upper and lower webbed plate elements 64 are disposed substantially horizontally and normal to the selected plane 40. Arms 30, 32 also include torsion pivot element receiving apertures 66. Upper ribbed planar beam arm 30 is balanced about a pivot axis 68 transverse to the selected plane 40, adjacent the upwardly extending leg 20. Similarly, the lower arm 32 is balanced about a pivot axis 70 transverse to the selected plane 40 and adjacent to the downwardly depending leg 22. The webbed plate elements 64 have major widths 72 intermediate opposing ends of the plate elements 64 spanning the pivot axes 68, 70. Along the major widths 72 and on opposing sides of the selected plane 40 are remotely spaced-apart ribbon bearing surfaces 74. An elongated ribbon bearing surface 74 is located on each of the webbed plate elements 64 transverse to the selected plane 40 and disposed within the arm receiving apertures 54, 56 of the vertical support 26.

Ribbon arrangement 34 comprises elongated flat elements of metal alloy typically 0.002 inch thick by 0.02 inch wide. The alloy is approximately 95% platinum and 5% nickel by weight, providing a material of high yield strength on the order of 36,000 psi (2.5 × $10^3$ kg/sq. cm.). The ribbon elements may have characteristics varying considerably from the aforementioned alloy. Although ribbon is preferable, the use of wire or filament is contemplated within the scope of this invention and the term ribbon is intended to include these equivalent materials. Ribbon arrangement 34 comprises upper and lower first taut band torsion pivot elements 76 coupling the upper and lower arms 30, 32 to the vertical support 26. The first pivot elements 76 are disposed on the elongated ribbon bearing surfaces 74. upper and lower second taut band torsion pivot elements 78 couple the upper and lower arms 30, 32 to the upwardly extending and downwardly depending legs 20, 22. The pivot elements 78 are disposed on the opposing ribbon bearing surfaces 72 of the upper and lower arms 30, 32. Pivot elements 76, 78 are pretensioned to approximately one-half of the yield strength of the ribbon, typically on the order of one-half kilogram. Upper and lower first taut band torsion pivot elements 76 are disposed in a substantially squared off U-shaped configuration within upper and lower peripheral regions, respectively, of the vertical support 26. The upper and lower first pivot elements 76 each comprise a transverse portion 80 disposed horizontally and normal to the selected plane and partially disposed within a region between the upper and lower arm receiving apertures 54, 56 of the pair of elongated plate elements 50. First torsion pivot elements 76 further include two spaced-apart vertical portions 82 extending on each side of the transverse portion 80. The vertical portions 82 bear on outer spacer rods 84 which are disposed in alignment with the arm receiving apertures 54, 56 and thus provide support for the transverse portions 80. Vertical portions 82 are looped about inner spacer rods 86 and include short ribbon portions looping back on and welded to the vertical portions 82 to maintain the first torsion pivot elements 76 in the fixed pretensioned relationship. The ribbons have typically four spot welds 88 adjacent each loop end to provide adequate strength.

It should be appreciated that the ribbon arrangement 34 serves several functions in this invention. It provides pivot bearings between the four branches of the deformable parallelogram structure 42, exerts a torsional force related to the twist on it exerted by a weight on the pan 28 which is balanced by an electric current to provide a mass measurement, and also carries an electric current to the force coil arrangement 44 as described below.

Stop means or travel limits 90, comprising a tab 92 on the vertical support 26 engageable with a fixed surface 94 on the frame 10 or more particularly with a fixed portion of the force coil arrangment 44 prevents the vertical support 26 from causing damage to the suspension upon application of an excess load to the pan 28. The travel limits 90, when engaged, are in alignment with the load so as to generate negligible or no moment about the limits 90. Therefore, excess forces are not applied to the second torsion pivot elements 78 coupling the upper and lower arms to the frame 10, as well as the first torsion pivot elements 76. The travel limits 90 in alignment with the load allows this suspension to be usable with wide ranges not otherwise possible in high sensitivity balances. Thus a weight far in excess of the withstandable weight otherwise effectively applied to the ribbon arrangement 34 may be placed on the sample pan. Weight measurement is achieved on null restoring balances by applying a current to a coil or torque motor so as to raise or restore the suspension to a null position and measuring that current. A weight which causes travel of the vertical support 26 in excess of its travel limits does not appear to be a factor in limiting the accurate measurement of the excess weight since only the current required to restore the balance to its null position is measured. Thus a wide range of weights may be measured utilizing a top loading suspension in accordance with this invention while still maintaining high sensitivity.

As best viewed in FIG. 7 the force coil arrangement 44 comprises a fixed portion including cup elements 96, cylindrical permanent magnets 98, pole pieces 100 and a non-magnetic spacer 102 and a movable portion 104 including coil windings 106 on a magnetic core 108. The magnetic core 108 has outwardly directed arms 110 extending normal to the axis of the core 108, fastened between the tabs 92 of the elongated plate elements 50 of the vertical support 26. The outwardly directed arms may also function as a stop tab to limit travel of vertical support 26. Cup elements 96 are coupled to the frame 10 joined between the upper and lower elongated supports 16, 18 and within a region bounded by the risers 14. The cylindrical permanent magnets 98 are situated centrally within the cup elements 96 and the pole pieces 100 are disposed on and coaxial with the magnets 98. The magnetic core 108 having coil windings 106 is disposed within an annular space between the permanent magnets 98 and pole pieces 100, and the cup elements 96 such that a movement of the vertical support 26 causes a movement of the movable portion 104 with respect to a magnetic field directed primarily radially between circumferential surfaces of the pole pieces 100 and the extremities of the cup elements 96. As depicted in the drawings, the vertical support 26 is mechanically joined to the movable portion 104 of the force coil arrangement 44 while the fixed portion is joined to the frame 10. Thus, a movement of the pan 28 with respect to the frame 10 causes a movement of the coil windings 106 and core 108 within the cup elements 96. The force coil arrangement 44 is utilized to provide a restoring torque to the pan 28 when a weight is placed thereon.

The preferred embodiment depicts two facing cup elements 96. This particular configuration provides shielding from stray magnetic fields and prevents magnetic field leakage which influences a load to current scale factor.

Threaded portions are joined to each of the upper and lower arms opposite the first ribbon portions and remote from the second ribbon portions. Mounted on the threaded portions are internally threaded counterweights 112 for providing an initial mechanical balance adjustment to the suspension.

Narrow plate elements 114 are mounted on each of the arms 22, 24 to clamp the first pivot elements 76 to the arms 22, 24 thereby coupling the arms to the vertical support 26.

As can be best viewed in FIGS. 4 and 5 the second pivot elements 78 are clamped between pairs of narrow plate elements 116. Spring loaded fasteners 118 including springs, mounted between the plate elements 116 and the upwardly extending leg 20, and screws, disposed through the plate elements 116, through the springs and threaded into the leg 20, couple the upper second pivot elements 78 to the frame 10. This spring loaded coupling provides compensation for loads asymmetrically distributed, with respect to the selected plan 40 such that reaction forces resulting from such asymmetric loading are absorbed substantially by the springs rather than by the second ribbon portions 78. The fasteners are also used to provide an initial axial adjustment of the beam arms 30, 32.

The ribbon arrangement 34 is used as a current carrier to transmit electricity to the windings 106 to increase sensitivity and eliminate errors during weighing resulting from bending motion of wires which would otherwise be directly connected to the coil windings 106. In the embodiment depicted in the drawings, a current carrying wire 120 is coupled to a tab 122 fastened to the upper plate elements 116. Current flows through the upper second pivot element 78, the upper arm 30 and through the upper first pivot element 76. A wire 124 from the coil windings 106 is soldered to the vertical portion 82 of the upper first pivot element 76. Current flows through the coil windings 106, to the lower first pivot element 76 to which the other end of the coil windings 106 is soldered. The electric flow path follows the lower arm 32, through the lower second pivot element 78, and to a tab 126 fastened to the lower plate elements 116 to which a return wire 124 is connected. Since negligible movement occurs about this fulcrum pivot, minimal error is induced by the wires. Insulating materials and standoffs are used to prevent electrical conduction between upper and lower plates 116 and between the legs 20, 22 of the frame 10, thereby electrically isolating the upper and lower arms 30, 32 from each other.

A photodiode unit 128 affixed to the risers 14 of the frame 10 provides an electrical signal related to the position of the vertical support 26 as is known in the art. A tab 130 extending horizontally from a side of one of the elongated plate elements 50 is disposed between a light source disposed to impinge on a light sensor so as to interrupt rays from the source on the sensor in relation to the vertical position of the tab 130 within the photodiode unit 128. The signal or voltage of the unit 128, applied to a servo circuit causes a current to be applied to the coil windings 106, via tabs 122, 126 tending to raise the vertical support 26 to an initial or null position. The current required to raise the support 26 to the null position may be measured providing an indication related to the weight of the sample on the pan 28.

In operation of the suspension, the counterweights 50 are initially adjusted so that the tabs 92 of the vertically movable structure 18 are disposed centrally between the two cup elements 96. A sample is placed on the sample pan 28 causing a downward vertical movement of the vertical support 26, and a slight rotation of the upper and lower arms 30, 32 and the ribbon arrangement 34. Compensation for asymmetric loading of the sample pan 28 is provided by the parallelogram structure 42 and the spring loaded fasteners 118. An excess weight on the sample pan 28 causes downward travel of the vertical support 26 and engagement of the tabs 92 with the fixed surface 94. No moment is generated about the travel limits 90, in line with the load, and thus, excess forces are not applied to the second ribbon portions 78 remote from the support 26. A current is applied to the coil windings 106 via the ribbon arrangement 34, causing the coil 108 to move upward in or from the field between the pole pieces 100 and the extremities of the cup elements 96 thereby moving the vertical support 26 upward toward its null position. The current required to return the pan 28 to the null position is used to provide an indication related to the weight of the sample.

While the invention has been particularly shown and described with reference to a preferred embodiment thereof, it will be understood by those skilled in the art that various changes in form and details may be made therein without departing from the spirit and scope of the invention.

What is claimed is:

1. In a top loading weighing system of the type having a sample support movable in a vertical direction and having a null position, means for detecting an off-null position of the sample support, and means for restoring the sample pan to the null position, a sample suspension comprising:
   a frame;
   a vertically movable structure disposed beneath a sample pan and coupled thereto;
   arm means horizontally disposed coupling the vertically movable structure to the frame for allowing movement of the vertically movable structure in response to a change in load;
   force coil means having a fixed portion coupled to the frame and a movable portion coupled to the vertically movable structure such that the movable portion travels with respect to the frame with the sample pan;
   stop means including means coupled to the vertically movable structure and means coupled to the frame for limiting vertical travel of the sample pan beyond a predetermined distance and disposed in substantial alignment with the sample support such that an excess load on the sample support generates a negligible moment about the stop means; and
   ribbon means coupling the arm means to the frame and exerting small torque about the ribbon means in opposition to a vertical force on the sample pan, and disposed such that rotation of the ribbon means is limited by engagement of the vertically movable structure coupled means and the frame coupled means of the stop means, the maximum weight exertable by the sample support on the ribbon means being less than the yield strength of the ribbon means and the vertical travel of the sample pan limiting angular rotation of the ribbon means for limiting hysteresis.

2. The invention as set forth in claim 1 and in which the ribbon means provide four pivots defining a deformable parallelogram in which the arm means and the vertically movable structure are movable branches of the parallelogram and an imaginary line between ribbon means coupling the arm means to the base defining a fixed branch of the parallelogram from which the arm means and vertically movable structure deform such that asymmetrical loads having a component within the plane of the parallelogram structure induce reaction forces by the parallelogram on the pivots, thereby providing compensation for asymmetric loading.

3. The invention as set forth in claim 1 and further comprising spring loaded fastening means mounted on the frame and coupling the ribbon means thereto for providing reaction forces on the ribbon to compensate for asymmetric loading of the balance pan.

4. The invention as set forth in claim 1 and in which the arm means comprise generally parallel upper and lower arms, and the ribbon means comprises first ribbon pivot elements, coupling the upper and lower arms to the vertically movable structure in a spaced apart-relationship, and second ribbon pivot elements coupling the upper and lower arms to the base remote from the vertically movable structure.

5. The invention as set forth in claim 1 and in which:
   the fixed portion of the force coil means comprises means for generating a magnetic field in a plane substantially perpendicular to a line of movement of the vertically movable structure; and
   the movable portion of the force coil comprises a coil disposed substantially within the magnetic field for generating an opposing magnetic field upon application of a current to move the vertically movable structure towards a null position.

6. A high sensitivity balance of the type having means for returning a portion of the balance to a null position, comprising:
   a frame comprising fulcrum means for supporting generally horizontal arm means;
   arm means for pivotally supporting a load remote from the fulcrum means substantially horizontally disposed and pivotably coupled to the fulcrum means;
   sample support means coupled to the arm means remote from the fulcrum means for receiving a load;
   ribbon means coupling the arm means to the fulcrum means for providing low friction low hysteresis torsional pivots; and
   stop means, disposed with respect to the sample support means such that limited moment about the stop means results from an excess load, for limiting forces applied to the ribbon means as a result of the excess load.

7. The invention as set forth in claim 6 and in which the means for returning a portion of the balance to a null position comprises:
   force coil means coupled in substantially vertical alignment with the sample support means for applying a force substantially directly in opposition to a load on the sample support means.

8. The invention as set forth in claim 6 and in which the stop means are engageable upon application of an excess load to the sample support means and are disposed substantially in line with the sample support means such that a load on the sample support means sufficient to engage the stop means provides negligible moment about the stop means.

9. The invention as set forth in claim 6 and in which spring loaded fasteners couple the ribbon means to the frame for providing reaction forces on the ribbon means compensating for loading of the sample support means asymmetric with respect to an axis of the arm means.

10. The invention as set forth in claim 6 and in which:
   the arm means comprises upper and lower arms;
   the sample support means comprises a vertically movable structure having a sample receiving means thereon; and
   the ribbon means pivotally and torsionally couple the upper and lower arms to upper and lower portions of the base means, and remote therefrom pivotally and torsionally couple the upper and lower arms to the sample support means such that the upper and lower arms, the sample support means and the frame provides a low hysteresis deformable parallelogram structure for compensating asymmetric loading of the sample support means.

11. In a top loading balance of the type having means for detecting an off-null position indicating an unbalance, and force coil means for restoring the balance to a null position, suspension and null restoring apparatus comprising:
   a frame;
   upper and lower planar beam arms horizontally disposed in a vertically spaced-apart, substantially parallel relationship;
   a vertically movable structure supporting a sample pan;
   ribbon means torsionally and pivotally coupling the upper and lower arms to the frame at upper and lower fulcrum axes and remote therefrom torsionally and pivotally coupling the upper and lower arms to the vertically movable structure;
   the force coil means being disposed between the upper and lower planar beam arms in substantial alignment with a load on the sample pan and comprising a fixed portion and a movable portion;
   the fixed portion comprising a first magnetic cup element coupled to the base having a magnetized central element disposed within the cup and a pole piece disposed adjacent the central element such that a magnetic field is substantially radially directed between the pole piece and outermost portions of the cup; and
   the movable portion comprising coil means coupled to the vertically movable structure and disposed within an annular space between the cup element and the central element and pole piece, such that the coil is at least partially aligned with the substantially radially directed magnetic field.

12. The invention as set forth in claim 11 and in which:
   the vertically movable structure comprises a pair of plate elements vertically disposed in a closely spaced apart relationship and including a plurality of spacer rods disposed transversely between and coupling said plate elements, the plate elements having upper and lower arm receiving apertures therein;
   the ribbon means comprise upper and lower taut band torsion pivot elements disposed in a substantially U-shaped configuration within the vertical structure, the spacer rods comprising upper and lower outer spacer rods, the upper outer spacer rods and the lower outer spacer rods each being spaced apart along separate transverse axes and spaced apart on opposite sides of the arm receiving apertures and inner spacer rods spaced apart from and disposed between a region bounded by the upper and lower outer spacer rods, and in which the upper and lower pivot elements each comprise:
   a transverse portion for coupling the pivot element to one of the arms, the transverse portion disposed at least partially within a region bounded by one of the arm receiving apertures and bearing on the associated outer spacer rods, the outer spacer rods disposed to align and support the transverse portion within the arm receiving apertures; and
   two spaced apart substantially vertical portions on each side of the transverse portion, the vertical portions bearing on the associated outer spacer rods and the inner spacer rods, and fixed about the inner spacer rods to maintain the torsion pivots in pretensioned relationship;
   the fixed portion comprises a second magnetic cup element coupled to the base having a magnetized central element disposed within the cup and a pole piece disposed adjacent the central element such that a magnetic field is substantially radially directed between the pole piece and outermost portions of the second magnetic cup; and
   the first and second cup elements are disposed with facing interior portions, shielding the force coil means from stray magnetic fields and preventing magnet field leakage and having a non-magnetic spacer disposed between the first and second cup elements.

13. The invention as set forth in claim 11 and in which the upper and lower torsion pivot elements comprise an electrically conductive material and in which the ribbon means comprise fulcrum pivot elements coupling the upper and lower arms to the frame, the upper and lower arms being electrically isolated from each other, the upper arm being in electrical contact with the upper pivot element, the force coil having a pair of terminal wires, the upper pivot element being in electrical contact with one of the force coil terminal wires, the other force coil terminal wire being in electrical contact with the lower torsion pivot element, the lower torsion pivot element being in electrical contact with the lower arm, such that conductors applying a voltage between the upper and lower arms adjacent the fulcrum pivot elements cause a flow of electrical current in the force coil without materially affecting the sensitivity of the balance.

14. A top loading, high sensitivity balance comprising:
a frame;
an upper arm and a lower arm disposed in a vertically spaced-apart, substantially parallel relationship;
first ribbon portions coupling the upper and lower arms to the frame;
a sample support structure for receiving a vertical load;
second ribbon portions coupling the upper and lower arms to a sample support structure remote from the first ribbon portions;
plate means for coupling the first ribbon portions to the upper and lower portions of the frame; and
spring loaded fasteners coupling the plate means to the upper and lower portions of the frame for absorbing substantial reaction forces applied to the first ribbon portions to compensate for loading of the sample support asymmetric with respect to a plane central to the sample support.

15. The invention as set forth in claim 14 and in which the upper and lower arms have plates and fastener means for engaging the plates against the arms, for clamping the second ribbon portions to the upper and lower arms, respectively.

16. The invention as set forth in claim 14 and in which the upper and lower arms have a plurality of apertures for weight reduction.

17. The invention as set forth in claim 14 and in which the upper and lower arms comprise adjustable counterweight elements disposed on at least one of the upper and lower arms opposite the first ribbon portions and remote from the second ribbon portions, for providing an initial manual balance adjustment.

18. In a top loading weighing mechanism in which a loading pan is disposed to be movable along a vertical weighing axis, the combination comprising:
a pan disposed to be movable substantially along the vertical weighing axis;
a vertical support comprising a pair of thin elongated plate elements disposed in closely spaced-apart relationship and including a plurality of insulating spacer rods disposed transversely between and coupling said plate elements, the planes of the plate elements being disposed substantially normal to a selected plane including the weighing axis, the plate elements having upper and lower arm receiving apertures and force coil cup receiving apertures therein;
a frame comprising upper and lower vertically spaced-apart fulcrums encompassing a fixed axis parallel to the vertical weighing axis and in the selected plane, said fulcrums supporting taut band torsion pivot elements disposed normal to the selected plane;
upper and lower beam arms comprising, respectively, upper and lower plate elements disposed normal to the selected plane, the upper arm being balanced about a pivot axis transverse to the selected plane adjacent the upper fulcrum, the upper plate element having remotely spaced apart ribbon bearing surfaces on opposite sides of the selected plane, and a portion of the upper arm having an elongated ribbon bearing surface transverse to the selected plane and disposed within the upper arm receiving aperture of the vertical support, the lower arm being balanced about a pivot axis transverse to the selected plane adjacent the lower fulcrum, the lower webbed plate element having remotely spaced-apart ribbon bearing surfaces on opposite sides of the selected plane, and a portion of the lower arm having an elongated ribbon bearing surface transverse to the selected plane and disposed within the lower arm receiving aperture of the vertical support, the upper and lower arm receiving apertures providing clearance for movement of the upper and lower arms within the respective apertures;
upper and lower first taut band torsion pivot elements, each comprising an elongated metal ribbon disposed on one of the elongated ribbon bearing surfaces transverse to the selected plane within the upper and lower arm receiving apertures, coupling the upper and lower arms respectively to the vertical support;
upper and lower second taut band torsion pivot elements, each comprising an elongated metal ribbon disposed transverse to the selected plane and having opposing end portions disposed on ribbon bearing surfaces of the upper and lower arms coupling the upper and lower arms to the upper and lower fulcrums, respectively;
a pair of narrow elongated plate elements disposed along the upper pivot axis sandwiching a portion of the upper second pivot elements therebetween and spring loaded fasteners coupling the narrow elongated plate elements to the upper fulcrum for compensating reaction forces resulting from pan loading force components asymmetric to the selected plane;
whereby the upper and lower arms define branches of a deformable parallelogram structure, the fixed axis and the weighing axis define two opposing parallel branches, the upper and lower arms define another two opposing parallel branches, and the structure is deformable upon weighing yet maintains a parallelogram configuration such that reaction forces resulting from asymmetric loading on the pan are compensated by reaction forces within the structure of the parallelogram; and
force coil means disposed along the weighing axis comprising a magnetic core having coil windings thereon affixed within a central portion of the vertical support, and facing cup elements disposed within cup receiving apertures of the vertical support and joined to the frame structure and in which the magnetic core is movable within the facing cup elements, such that an electric current applied to the coil windings provides a direct force in opposition to a load applied to the pan for moving the vertical support and the pan upward towards a null position.

19. The invention as set forth in claim 18 and further comprising:
  travel limit elements coupled to and movable with the vertical support, and a fixed surface coupled to the frame in engageable proximity to the travel limit elements such that excess vertical travel of the vertical support resulting from an excess load on the pan is limited by engagement of the travel limit elements on the fixed surface, generating negligible moment about the travel limit elements and thereby limiting forces exerted on the upper and lower second taut band torsion pivot elements as a result of the excess load.

20. The invention as set forth in claim 18 and in which the vertical support comprises upper and lower peripheral regions, the upper and lower first taut band torsion pivot elements are disposed in a substantially squared off U-shaped configuration within the upper and lower peripheral regions respectively, of the vertical support, the spacer rods comprise outer spacer rods disposed along a transverse axis and spaced-apart on opposite sides of the arm receiving apertures and inner spacer rods spaced-apart from and disposed between a region bounded by the outer spacer rods, and in which the upper and lower first pivot elements each comprise:
  a transverse portion for coupling the first pivot element to the arm, the transverse portion disposed normal to the selected plane and at least partially within a region bounded by the arm receiving apertures and bearing on the outer spacer rods, the outer spacer rods disposed to align and support the transverse portion within the arm receiving apertures;
  two spaced-apart, substantially vertical portions on each side of the transverse portion, the vertical portions bearing on the outer spacer rods and looping about the inner spacer rods, and comprising short ribbon portions looping back on and welded to the vertical portions to maintain the torsion pivots in fixed pretensioned relationship.

21. The invention as set forth in claim 20 and in which the force coil windings comprise a first end and a second end, the first end being soldered to the upper first torsion pivot element, the second end being soldered to the lower first torsion pivot element, the mechanism further comprising electrically conductive tabs coupled to the upper and lower arms adjacent the opposing ribbon bearing surfaces proximate the upper and lower fulcrums, for carrying a current between the tabs on the upper and lower arms, through the upper and lower arms, through the upper and lower first pivot elements and through the coil windings.

22. In a top loading weighing mechanism in which a loading pan is disposed to be movable along a vertical weighing axis, the combination comprising:
  a pan disposed to be movable substantially along the vertical weighing axis;
  a vertical support comprising a pair of thin elongated plate elements disposed in closely spaced-apart relationship and including a plurality of insulating spacer rods disposed transversely between and coupling said plate elements, the planes of the plate elements being disposed substantially normal to a selected plane including the weighing axis, the plate elements having upper and lower arm receiving apertures and force coil cup receiving apertures therein;
  a frame having a platform base and a plurality of spaced-apart risers disposed about the selected plane proximate the weighing axis extending vertically from the base, said frame including an upper elongated support extending laterally from the risers along the selected plane, a lower elongated support disposed beneath and parallel to the upper elongated support and extending laterally from the risers along the selected plane, the upper elongated support having a short upwardly extending leg remote from the risers, the lower elongated support having a short downwardly depending leg remote from the risers, the upwardly extending leg and the downwardly depending leg encompassing a fixed axis parallel to the vertical axis and in the selected plane;
  upper and lower ribbed planar beam arms, comprising, respectively, upper and lower webbed plate elements disposed normal to the selected plane and including torsion pivot element receiving apertures, and having ribs extending normally with respect to the plane of the webbed plate elements, the upper arm being balanced about a pivot axis transverse to the selected plane adjacent the upwardly extending leg of the frame, the upper webbed plate element having a major width spanning the pivot axis and remotely spaced apart ribbon bearing surfaces on opposite sides of the selected plane along the major width, and a portion of the upper webbed plate element having an elongated ribbon bearing surface transverse to the selected plane and disposed within the upper arm receiving aperture of the vertical support, the lower arm being balanced about a pivot axis transverse to the selected plane adjacent the downwardly depending leg of the frame, the lower webbed plate element having a major width spanning the last mentioned pivot axis and remotely spaced apart ribbon bearing surfaces on opposite sides of the selected plane along the major width, and a portion of the lower arm having an elongated ribbon bearing surface transverse to the selected plane and disposed within the lower arm receiving aperture of the vertical support, the upper and lower arm receiving apertures providing clearance for movement of the upper and lower arms within the respective apertures;
  upper and lower second taut band torsion pivot elements each comprising an elongated metal ribbon disposed transverse to the selected plane and having opposing end portions disposed on ribbon bearing surfaces of the upper and lower arms coupling the upper and lower arms to the upwardly extending and downwardly depending legs, respectively;
  upper and lower first taut band torsion pivot elements each comprising an elongated metal ribbon disposed on one of the elongated ribbon bearing surfaces transverse to the selected plane within the upper and lower arm receiving apertures, coupling the upper and lower arms respectively to the vertical support;

whereby the upper and lower arms define branches of a deformable parallelogram structure, the fixed axis and the weighing axis define two opposing parallel branches, the upper and lower arms define another two opposing parallel branches, and structure is deformable upon weighing yet maintains a parallelogram configuration such that reaction forces resulting from asymmetric loading on the pan are compensated by reaction forces within the structure of the parallelogram;

and force coil means disposed along the weighing axis comprising a magnetic core having coil windings thereon affixed within a central portion of the vertical support, and facing cup elements disposed within cup receiving apertures of the vertical support and joined to the frame structure and in which the magnetic core is movable within the facing cup elements, such that an electric current applied to the coil windings provides a direct force in opposition to a load applied to the pan for moving the vertical support and the pan upward towards a null position.

23. The invention as set forth in claim 22 and in which the vertical support comprises:

tab elements having surfaces extending laterally inward from the elongated plate elements, movable with the support, and in which the facing cup elements comprise fixed surfaces encompassing at least a portion of the tabs such that excess vertical travel of the vertical support resulting from an excess load on the pan is limited by the fixed surfaces, generating negligible movement about the tabs, and thereby limiting forces exerted on the upper and lower second taut band torsion pivot elements as a result of the excess load.

24. The invention as set forth in claim 22 and in which the vertical support comprises upper and lower peripheral regions, the upper and lower first taut band torsion pivot elements are disposed in a substantially squared off U-shaped configuration within the upper and lower peripheral regions respectively, of the vertical support, the spacer rods comprise outer spacer rods adjacent to the arm receiving apertures and inner spacer rods spaced apart from and disposed between a region bounded by the outer spacer rods, and in which the upper and lower first pivot elements each comprise:

a transverse portion disposed normal to the selected plane and at least partially within a region bounded by the arm receiving apertures for coupling the first pivot elements to the arms; and two spaced apart substantially vertical portions depending on each side of the transverse portions, the vertical portions bearing on the outer spacer rods, the outer spacer rods disposed to align and support the transverse portions within the arm receiving apertures and looping about the inner spacer rods, and comprising short ribbon portions looping back on and welded to the vertical portions to maintain the torsion pivots in fixed pretensioned relationship.

25. The invention as set forth in claim 22 and in which the vertical support comprises a tab extending laterally from one of the elongated plate elements and disposed within a chamber having a light source and a light sensor therein and variably interrupting a light from the source impinging on the sensor in accordance with the vertical position of the vertical support for providing an indication to a servo circuit to supply a current to the force coil windings tending to raise the pan and vertical support to a null position whereby said current, relating to the mass of an object being weighed may be measured.

* * * * *